United States Patent Office 2,817,655
Patented Dec. 24, 1957

2,817,655
AZO DYESTUFFS CONTAINING HEAVY METAL

Guido Schetty and Fabio Beffa, Basel, Switzerland, assignors to J. R. Geigy A. G., Basel, Switzerland, a Swiss firm No Drawing. Application August 24, 1953
Serial No. 376,237

Claims priority, application Switzerland
September 10, 1952

6 Claims. (Cl. 260—147)

The present invention concerns the production of monoazo dyestuffs containing heavy metal which are excellently suited for the fast dyeing from a neutral to weakly acid dyebath of wool and of synthetic polypeptide fibres similar thereto such as nylon, Perlon or casein fibres.

It is known that complex chromium compounds of metallizable monoazo dyestuffs which contain no acid water solubilising groups such as sulphonic acid or carboxyl groups are very suitable for the fast dyeing of wool and similar fibres insofar as they have sufficient water solubility for dyeing purposes. If certain hydrophilic substituents are not present in the dyestuff molecule, generally the water solubility of such dyestuffs in insufficient. A hydrophilic substituent which can be easily introduced and is therefore often used is the sulphamide group —$SO_2NH_2$. Its acid character however, is so prominent that it has an unfavourable influence on the drawing power on to wool from a neutral bath. Complex chromium compounds of azo dyestuffs which have no acid water solubilising groups and contain the sulphamide group as hydrophilic substituent can be seen, on dyeing wool, to need acid to a greater or lesser extent according to the constitution which prejudices their use in combination with other chromium-containing dyestuffs. The substitution of the sulphamide group by hydrocarbon radicals greatly reduces the hydrophilic action, whereby in the simple substituted sulphamide group

—$SO_2$—NH—R the acid character is only slightly influenced; in the twice substituted sulphamide group the acid character and also its hydrophilic properties are practically removed.

It has now been found that complex chromium and cobalt compounds of metallizable monoazo dyestuffs without acid groups, with the exception of a carboxyl group which may possibly be present participating in the complex metal linkage, are sufficiently water soluble and need only a very slight addition of acid when dyeing wool if there is at least one and, advantageously not more than two, sulphonic acid oxalkyl-alkylamide groups as hydrophilic substituents in the dyestuff molecule, be it in the diazo or the coupling components.

The metal-containing dyestuffs according to the present invention are obtained by treating with agents giving off chromium or cobalt, monoazo dyestuffs of the general formula:

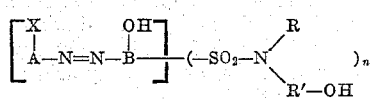

wherein:

A represents the radical of a diazo component,
B represents the radical of an azo component coupling in the o-position to the hydroxyl group, X represents a hydroxyl or carboxyl group standing in the o-position to the azo group or a substituent which can be converted into such a group under the conditions of the metallizing reaction, R and R' represents low molecular aliphatic or, if desired, also alicyclic hydrocarbon radicals, and $n$ represents 1 or 2, and wherein the sulphamide groups are aromatically bound. The radicals A and B can be substituted as desired provided the substitution is non-ionogenic, e. g. by halogen, alkyl, alkoxy, aryloxy, nitroacylamino, alkylsulphonyl, arylsulphonyl, sulphonic acid dialkylamide, sulphonic acid aryl ester, carboxylic acid ester and carboxylic acid amide groups. They should not contain any acid water solubilizing groups however, apart from the radical A which may have a carboxyl group participating in the complex formation.

The complex heavy metal compounds correspond to the type (D—$M_1$—D)$M_2$. In this formula, D represents the monoazo dyestuff according to this invention, $M_1$ represents a complexly bound cobalt or chromium atom and $M_2$ represents the equivalent of a cation, in particular that of an alkali metal or ammonium.

The unsulphonated diazo and coupling components usual in the production of chromium dyestuffs, if desired those containing the substituents listed above, can be used to form the monoazo dyestuffs usable according to the present invention. o-hydroxy, o-carboxy- or o-alkoxy-amino compounds of the benzene and naphthalene series can be used as diazo components; as coupling components, those compounds of the aliphatic, aliphatic-aromatic, aromatic-isocyclic or aromatic-heterocyclic series coupling in the o-position to a phenolic or enolic hydroxyl group are suitable, in particular acylacetic acid arylamide, phenols, naphthols, 5-pyrazolones. At least one of the components of the azo dyestuff should contain a sulphonic acid oxalkyl-alkylamide group; this is easily done by converting sulphonic acid groups according to the usual methods into sulphonic acid halide groups and treating these with an excess of a secondary alkanol-amine. It is preferable that the sulphamide group be derived from methylamino or ethylamino alkanols wherein the alkanol radical can contain 2–6 carbon atoms and it is advantageous if the hydroxyl and the amino group are bound to neighbouring carbon atoms. The sulphonic acid methyl- or ethyl-oxethyl-amide groups are particularly valuable substituents.

Diazo components with a sulphamide group according to the present invention can be produced e. g. from 4-halogen-3-nitrobenzene-1-sulphochloride by reaction with methyl- or ethyl-amino ethanol, exchange of the halogen atom for the hydroxyl group by means of caustic alkalies and reduction of the nitro to the amino group. Coupling components with the sulphamide group according to the present invention are obtained, e. g. from 3- or 4-aminobenzene-1-sulphonic acid-methyl- or ethyl-oxalkylamide by reacting with acylacetic esters or diketene whereby acylacetic ester arylamides result, or by diazotizing the amino group, reducing the diazo to the hydrazino group and condensing with acyl acetic esters to form 1-aryl-5-pyrazolones. The coupling components can also be obtained from acyloxynaphthalene-sulphonic acid halides and alkylamino alkanols and saponification of the acyloxy to hydroxyl groups. The diazotization is performed with sodium nitrite as usual in the cold in mineral acid solution or suspension and the coupling is done in an alkaline solution. Yellow, orange, red, brown, violet, blue and grey dyestuffs can be produced which can be converted into the corresponding coloured heavy metal complexes.

The metallization is performed advantageously in aqueous solution or suspension at raised temperature by the action of salts of cobalt or of trivalent chromium. It is done in such a way that there is at least 1 atom of heavy metal to two dyestuff molecules. Preferably the alkali salts of chromosalicylic acid are used for chroming. The metallization can be performed open under reflux or in a closed vessel under pressure, if necessary with the addition of dispersing agents such as Turkey red oil. It can also be done in high boiling organic solvents and diluents, e. g. in formamide, dimethyl formamide or in the urea melt. Temperatures of over 100° and the use of pressure are particularly recommended when any substituents in the o-position to the azo group such as alkoxy groups or halogen atoms are to be replaced by the hydroxyl group during the metallizing process.

The complex chromium or cobalt compounds of the monoazo dyestuffs defined above generally have sufficient water solubility for dyeing purposes. If necessary it can be improved by mixing the dyestuffs with inorganic salts having an alkaline reaction such as sodium carbonate or trisodium phosphate or with organic anion active wetting and dispersing agents such as soap and synthetic washing agents.

The new chromium or cobalt-containing dyestuffs dye wool very evenly even from a neutral to weakly acid bath, e. g. one containing ammonium sulphate and Glauber's salts, with very good exhaustion of the dyebath. Due to their similar behaviour on dyeing they can be combined very well or also can be combined with other similar dyestuffs.

The following examples illustrate the invention without limiting it in any way. Where not otherwise stated, parts are given as parts by weight and the temperatures are in degrees centigrade. The relationship of parts by weight to parts by volume is as that of kilogrammes to litres.

EXAMPLE 1

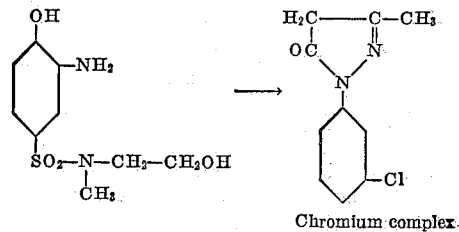

Chromium complex 24.6 parts of 2-amino-1-hydroxybenzene-4-sulphonic acid-N-methyl-hydroxyethylamide are dissolved in 200 parts of hot water with 17 parts of concentrated hydrochloric acid, the solution is cooled to 5° and diazotized with a solution of sodium nitrite (corresponding to 6.9 parts). The diazonium suspension is made neutral with sodium bicarbonate and poured into a solution of 21.9 parts of 1-(3'-chloro)-phenyl-3-methyl-5-pyrazolone, 10.5 parts by volume of 10 N-caustic soda lye and 12 parts of anhydrous soda in 100 parts of water. On completion of the dyestuff formation, the dyestuff is isolated at 70° by the addition of sodium chloride and, after being pasted in 600 parts of hot water, is chromed by boiling with 120 parts by volume of a solution of ammonium chromosalicylate (corresponding to 4.2 parts of chromic oxide) until the complex formation is complete. The chromium containing dyestuff is isolated by filtering. After drying it is a brown-yellow powder which dyes wool from a neutral or weakly acid bath in very fast, level orange shades.

If in the above example, the 1-(3'-chloro)-phenyl-3-methyl-5-pyrazolone is replaced by 25.5 parts of 1-(3':4'-dichloro)-phenyl-3-methyl-5-pyrazolone, a dyestuff having similar properties is obtained.

2-amino-1-hydroxybenzene-4-sulphonic acid-N-methyl-hydroxyethylamide can be produced as follows:

1-chloro-2-nitrobenzene-4-sulphochloride is converted into the corresponding 1-chloro-2-nitrobenzene-4-sulphonic acid-N-methyl-hydroxyethylamide by treatment with N-methyl-ethanolamine in an aqueous medium at a low temperature. This product is stirred at the boil for some hours with diluted caustic soda lye. The resulting 2-nitro-1-hydroxybenzene-4-sulphonic acid-N-methyl-hydroxyethylamide is reduced to the amino compound by the usual methods, e. g. by heating with sodium sulphide solution. (M. P. 177°.)

EXAMPLE 2

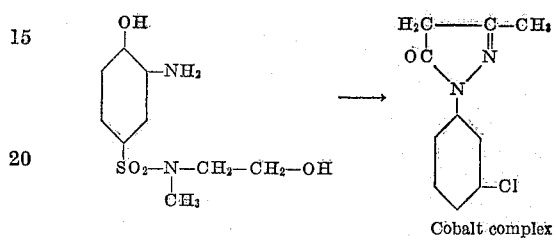

Cobalt complex 48.8 parts of the dyestuff which is obtained according to Example 1 by diazotizing 2-amino-1-hydroxybenzene-4-sulphonic acid-N-methyl-hydroxyethylamide and coupling with 1-(3'-chloro)-phenyl-3-methyl-5-pyrazolone, is heated for 1 hour at 80° in 600 parts of water with 60 parts of cobalt acetate (corresponding to 3.54 parts Co). Anhydrous soda is added until there is a phenolphthalein alkaline reaction (11 parts) and the whole is stirred for another 5 hours at 80–85°. The cobalt containing dyestuff is isolated by the addition of sodium chloride. After drying, the dyestuff is a brown powder which dyes wool from a neutral or weakly acid bath in orange yellow shades which have very good wet fastness and very high light fastness properties.

EXAMPLE 3

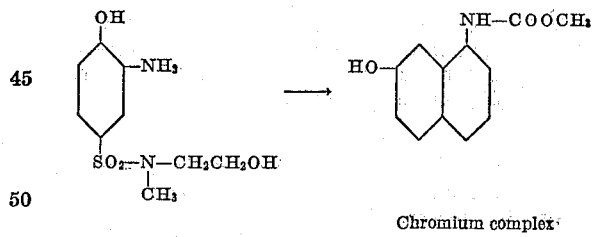

Chromium complex 24.6 parts of 2-amino-1-hydroxybenzene-4-sulphonic acid-N-methyl-hydroxyethylamide are diazotized as described in Example 1. The diazonium suspension is then neutralised with sodium bicarbonate and poured at 0–5° into a solution of 22.8 parts of 1-carbomethoxyamino-7-hydroxynaphthalene in 200 parts of water, 4.2 parts of sodium hydroxide and 15 parts of soda. The whole is stirred at 0–5° until the dyestuff formation is complete, then quickly heated to 60° and the dyestuff is precipitated by the addition of sodium chloride. It is pasted in 750 parts of hot water, 120 parts by volume of a solution of ammonium chromosalicylate (corresponding to 4.2 parts of chromic oxide) are added and the whole is boiled until the complex formation is complete. The chromium containing dyestuff is isolated by the addition of sodium chloride. After drying, it is a blue grey powder which dyes wool from a neutral or a weakly acid bath in very fast, level blue grey shades.

If in the above example the 1-carbomethoxyamino-7-hydroxynaphthalene is replaced by 21.1 parts of 1-acetylamino-7-hydroxynaphthalene or by 27.4 parts of 7-hydroxynaphthyl-(1)-carbamic acid methoxy ethyl ester, dyestuffs with similar properties are obtained.

EXAMPLE 4

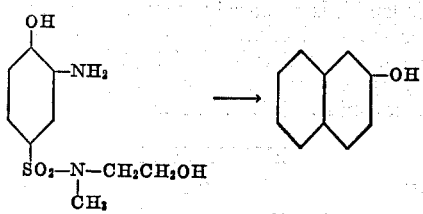

Chromium complex 24.6 parts of 2-amino-1-hydroxybenzene-4-sulphonic acid-N-methyl-hydroxyethylamide are diazotized as described in Example 1. The diazonium suspension is then neutralized with sodium bicarbonate and poured at 0–5° into a solution of 15.1 parts of 2-hydroxynaphthalene in 200 parts of water, 4.2 parts of sodium hydroxide and 15 parts of soda. After the dyestuff formation is complete the dyestuff is isolated by filtration. It is heated in 750 parts of hot water with 120 parts of a solution of ammonium chromosalicylate (corresponding to 4.2 parts of chromic oxide) and the whole is boiled until the complex formation is complete. The chromium containing dyestuff is isolated by the addition of sodium chloride, filtered, and dried. It is a violet black powder which dyes wool from a neutral or a weakly acid bath in fast, level violet shades.

EXAMPLE 5

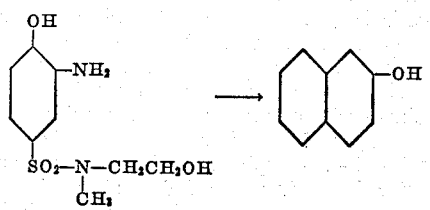

Cobalt complex 24.6 parts of 2-amino-1-hydroxybenzene-4-sulphonic acid-N-methyl-hydroxyethylamide are diazotized according to Example 1 and coupled with 2-hydroxynaphthalene as described in Example 4. The dyestuff is isolated and then pasted in 750 parts of water at 80°, 10 parts by volume of 10 N-caustic soda lye and 60 parts of a cobalt acetate solution (corresponding to 3.54 parts of Co) are added and the whole is stirred for 1½ hours at 75–80°. The cobalt containing dyestuff is precipitated by the addition of concentrated hydrochloric acid and filtered off. After drying, it is a dark brown powder which dyes wool from a neutral or weakly acid bath in wine red shades. The dyeings have excellent fastness properties.

EXAMPLE 6

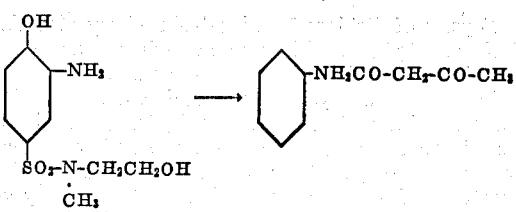

Cobalt Complex 24.6 parts of 2-amino-1-phenol-4-sulphonic acid-N-methyl-hydroxyethylamide are diazotized as described in Example 1 and neutralised with sodium bicarbonate. The diazonium suspension is then poured into a solution of 18.6 parts of acetoacetic acid anilide, 10.5 parts by volume of 10 N-caustic soda lye and 12 parts of anhydrous soda in 100 parts of water. When the formation of the dyestuff is complete, the dyestuff is isolated at 70° by means of sodium chloride and, after being pasted in 600 parts of water with 60 parts of cobalt acetate solution (corresponding to 3.54 parts Co), it is metallized for 3 hours at 80–85°. Sodium carbonate is added until there is a phenolphthalein alkaline reaction and the whole is heated for a further 3 hours at 80–85°. The dyestuff is precipitated by the addition of sodium chloride, filtered off and dried. The new dyestuff, a brown-yellow powder, dyes wool from a neutral or weakly acid bath in very fast reddish yellow shades.

If the acetoacetic acid anilide is replaced by 22.2 parts of acetoacetic acid-2'-chloranilide, a dyestuff with a somewhat increased drawing power is obtained.

EXAMPLE 7

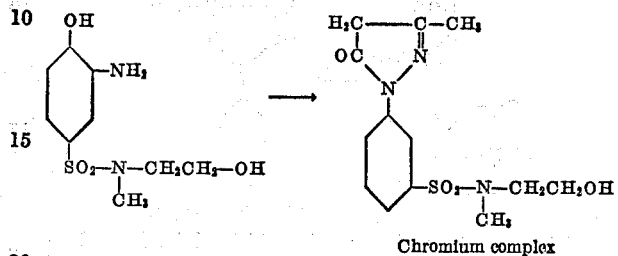

Chromium complex 24.6 parts of 2-amino-1-hydroxybenzene-4-sulphonic acid-N-methyl-hydroxyethylamide are diazotised according to Example 1. The diazonium suspension is neutralized by the addition of sodium bicarbonate, a further 3 parts of sodium bicarbonate are added and the whole is poured into a solution of 32.7 parts of 1-phenyl-3-methyl-5-pyrazolone-3'-sulphonic acid - N - methyl-hydroxyethylamide in 100 parts of water and 10.5 parts by volume of 10 N-caustic soda lye. On completion of the dyestuff formation, the dyestuff is salted out and filtered off. It is then pasted in 600 parts of water, 120 parts of a solution of ammonium chromosalicylate (corresponding to 4.2 parts of chromic oxide) are added and the whole is boiled for some hours. After drying, the chromium complex which is isolated by means of sodium chloride, is a brown orange powder which dyes wool from a weakly acid bath in full very level orange shades. The dyeings have very good fastness properties.

1-phenyl - 3 - methyl-5-pyrazolone-3'-sulphonic acid-N-methyl-hydroxyethylamide is produced as follows:

m-Nitrobenzene sulphochloride is converted at 0–5° in an aqueous medium into the corresponding m-nitrobenzene sulphonic acid-N-methyl-hydroxyethylamide with N-methylethanolamine. The reduction of the nitro to the amino group and the conversion of the diazo compound into the corresponding hydrazine and the condensation to 1-phenyl-3-methyl-5-pyrazolone-3'-sulphonic acid-N-methyl-hydroxyethylamide are performed in the usual manner.

EXAMPLE 8

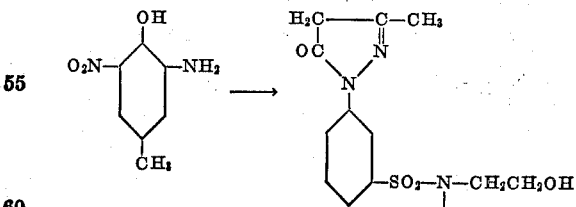

Chromium complex 16.8 parts of 4 - methyl - 6 - nitro-2-amino-1-hydroxybenzene are dissolved in 150 parts of hot water with 17 parts of concentrated hydrochloric acid. The solution is cooled to 5° and diazotized with a sodium nitrite solution (corresponding to 6.9 parts). The diazonium suspension is neutralized with sodium bicarbonate. A further 3 parts of sodium bicarbonate are added and the whole is poured into a solution of 32.7 parts of 1-phenyl-3 - methyl-5-pyrazolone-3'-sulphonic acid - N - methyl-hydroxyethylamide in 100 parts of water and 10.5 parts by volume of 10 N-caustic soda lye. On completion of the dyestuff formation, the dyestuff is isolated at 60° by the addition of sodium chloride, pasted in 600 parts of water, 120 parts of a solution of ammonium chromosalicylate (corresponding to 4.2 parts of chromic oxide) are added and the whole is boiled until the complex formation is complete. The chromium containing dyestuff is filtered off. After drying, it is a brown black powder which dyes wool from a weakly acid bath in very fast, level bluish red shades.

EXAMPLE 9

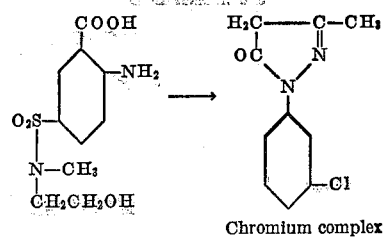

27.4 parts of 2-aminobenzoic acid-5-sulphonic acid-N-methyl-hydroxyethylamide are dissolved in 150 parts of water with 10.5 parts by volume of 10 N-caustic soda lye, a solution of 6.9 parts of sodium nitrite is added and, after cooling to 5°, the whole is stirred into a mixture of 30 parts of concentrated hydrochloric acid, 100 parts of water and 30 parts of ice. Sodium bicarbonate is added until there is a neutral reaction to congo red paper, a further 3 parts of sodium bicarbonate are added and the diazonium compound is then poured into a solution of 21.9 parts of 1-(3'-chloro)-phenyl-3-methyl-5-pyrazolone, 10.5 parts by volume of 10 N-caustic soda lye in 100 parts of water.

On completion of the dyestuff formation, the dyestuff is isolated by means of sodium chloride and, after being pasted in 600 parts of hot water, it is chromed by boiling with 120 parts of a solution of ammonium chromosalicylate (corresponding to 4.2 parts of chromic oxide) until the complex formation is complete. The chromium containing dyestuff is precipitated with sodium chloride, filtered off and dried. After drying, it is an orange yellow powder which dyes wool from a neutral or weakly acid bath in very fast, level, yellow shades.

2-amino-benzoic acid-5-sulphonic acid-N-methyl-hydroxyethylamide is produced as follows:

2-chlorobenzoic acid-5-sulphochloride is stirred at 0–10° for some hours with N-methylethanolamine, the resulting 2-chlorobenzoic acid-5-sulphonic acid-N-methyl-hydroxyethylamide is converted into the 2-amino compound by treatment in the autoclave under pressure at 160–180° with concentrated ammonia in the presence of copper powder and copper salts. (M. P. 186°.)

EXAMPLE 10

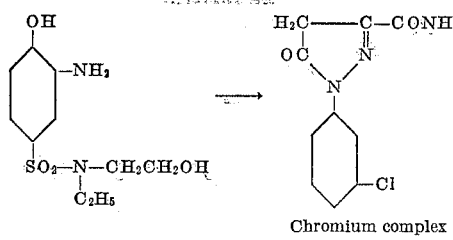

26 parts of 2-amono-1-hydroxybenzene-4-sulphonic acid-N-ethyl-hydroxyethylamide are diazotized according to Example 1 and coupled with 25 parts of 1-(3'-chloro)-phenyl-5-pyrazolone-3-carboxylic acid amide in a soda alkaline medium. The dyestuff is isolated and boiled in 650 parts of water with 120 parts of a solution of ammonium chromosalicylate (corresponding to 4.2 parts of chromic oxide) until no more of the original dyestuff can be traced. The chromium containing dyestuff is then isolated by the addition of sodium chloride. After filtering and drying, the dyestuff is a brown red powder which dyes wool from a neutral or a weakly acid bath in very fast red shades.

2-amino-1-hydroxybenzene-5-sulphethyl-hydroxyethylamide is produced according to the information given for the production of 2-amino-1-hydroxybenzene-4-sulphomethyl-hydroxyethylamide (see Example 1) by replacement of the methylethanolamide by ethylethanolamide. (M. P. 170°.)

EXAMPLE 11

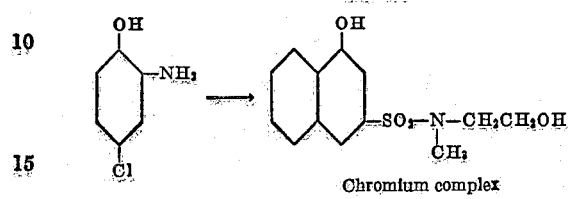

14.4 parts of 4-chloro-2-amino-1-phenol in 100 parts of water and 17 parts of concentrated hydrochloric acid are diazotized at 0–5° with 20 parts by volume of 5 N-sodium nitrite solution. After neutralizing with sodium carbonate at 0–3° the diazonium suspension is poured into a solution of 29.5 parts of 1-naphthol-3-sulphonic acid-N-methyl-hydroxyethylamide, 10.5 parts by volume of 10 N-caustic soda lye and 300 parts of water. On completion of the dyestuff formation, sodium chloride is added, the dyestuff is filtered off, pasted in 800 parts of water, 200 parts by volume of a solution of ammonium chromosalicylate (corresponding to 7.6 parts of $Cr_2O_3$) are added and the whole is boiled under reflux for 20 hours. The chromium containing dyestuff is precipitated by the addition of sodium chloride, filtered off and dried. It is a blue-black powder which dyes wool from a neutral or weakly acid bath in navy blue shades.

1-naphthol-3-sulphonic acid-N-hydroxyethylmethylamide is produced as follows: 1-naphthol-3-sulphonic acid is esterified with toluene sulphochloride and after thorough drying is converted with phosphorus pentachloride into 1-tosylnaphthol-3-sulphonic acid chloride. This is then condensed with methylethanolamine and the tosyl radical is split off by heating with diluted caustic soda lye. M. P. (recrystallized from diluted alcohol) 134–135°.

EXAMPLE 12

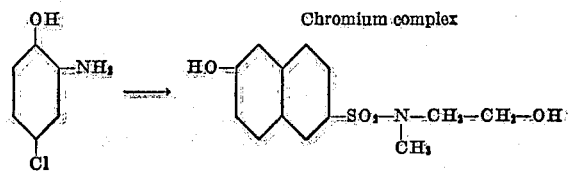

14.4 parts of 4-chloro-2-amino-1-phenol are diazotized and after neutralizing with sodium bicarbonate are poured at 15° into a solution of 29.5 parts of 2-naphthol-6-sulphonic acid-N-hydroxyethylmethylamide, 4.4 parts of sodium hydroxide and 12 parts of anhydrous soda in 600 parts of water. The whole is then heated to 20° and stirred at this temperature until the coupling is complete. 16 parts of sulphonated castor oil and 120 parts by volume of a solution of ammonium chromosalicylate (corresponding to 4.55 parts $Cr_2O_3$) are added and the whole is boiled for 3 hours under reflux. The mixture is cooled to 95°, 90 parts of sodium chloride are added, the whole is boiled for further ½ hour and then the precipitated dyestuff is filtered off hot. After drying, the dyestuff is a blue-violet powder which dyes wool from a neutral bath in clear violet shades which have very good fastness properties.

2-naphthol-6-sulphonic acid-N-hydroxyethylmethylamide is produced as follows:

2-hydroxy-1-naphthoic acid-6-sulphonic acid chloride is condensed with methylethanolamine and the carboxyl is decarboxylated by heating in a weakly acid medium. M. P. (from alcohol) 184–185.5°.

The following dyestaffs can be produced according to the information given in the above examples:

Table

| No. | Diazo component | Coupling component | Metal | Colour of the metal complex on wool |
|---|---|---|---|---|
| 1 | 5-chloro-2-amino-1-phenol-4-sulphonic acid-N-methyl-hydroxy-ethylamide. | 1-phenyl-3-methyl-5-pyrazolone. | Cr | scarlet. |
| 2 | 4-methyl-2-amino-1-phenol-5-sulphonic acid-N-methyl-hydroxy-ethylamide. | ----do---- | Cr | Do. |
| 3 | ----do---- | 1-(3'-chlorophenyl)-3-methyl-5-pyrazolone. | Co | brownish yellow. |
| 4 | 4-chloro-2-amino-1-phenol-6-sulphonic acid-N-methyl-hydroxy-ethylamide. | 1-phenyl-3-methyl-5-pyrazolone. | Cr | red. |
| 5 | 2-amino-1-phenol-4-sulphonic acid-N-methyl-hydroxy-ethylamide. | 3.4-dimethyl-1-phenol. | Cr | reddish brown. |
| 6 | 4-nitro-2-amino-1-phenol-6-sulphonic acid-N-ethyl-hydroxy-ethylamide. | 4-amyl-1-phenol. | Cr | brown. |
| 7 | 4-chloro-2-amino-1-phenol. | 1-hydroxynaphthalene-4-sulphonic acid-N-methyl-hydroxy-ethylamide. | Cr | reddish violet. |
| 8 | 4-nitro-2-amino-1-phenol. | ----do---- | Cr | Bordeaux red. |
| 9 | 5-nitro-2-amino-1-phenol. | ----do---- | Cr | blue-violet. |
| 10 | 6-nitro-4-methyl-2-amino-1-phenol. | 1-hydroxynaphthalene-3-sulphonic acid-N-methyl-hydroxy-ethylamide. | Cr | navy blue. |
| 11 | 4-chloro-5-nitro-2-amino-1-phenol. | 1-hydroxynaphthalene-5-sulphonic acid-N-methyl-hydroxy-ethylamide. | Cr | greenish grey. |
| 12 | 4.6-dinitro-2-amino-1-phenol. | 2-hydroxynaphthalene-8-sulphonic acid-N-methyl-hydroxy-ethylamide. | Cr | violet brown. |
| 13 | 2-amino-1-phenol-5-sulphonic acid-N-methylhydroxy-ethylamide. | 1-(3'-chlorophenyl)-3-methyl-5-pyrazolone. | Cr | scarlet. |
| 14 | 4-chloro-2-amino-1-phenol. | 2-hydroxynaphthalene-6-sulphonic acid-N-methyl-hydroxy-ethylamide. | Co | ruby red. |
| 15 | 6-nitro-4-methyl-2-amino-1-phenol. | 2-hydroxynaphthalene-4-sulphonic acid-N-methyl-hydroxy-ethylamide. | Cr | grey. |
| 16 | 4-chloro-2-amino-1-phenol. | ----do---- | Cr | reddish navy blue. |
| 17 | 4.6-dichloro-2-amino-1-phenol. | ----do---- | Cr | violet-grey. |
| 18 | 6-nitro-2-amino-1-phenol. | 1-(3'-sulphonic acid-N-methyl-hydroxy ethylamidophenyl)-3-methyl-5-pyrazolone. | Cr | scarlet. |
| 19 | anthranilic acid. | ----do---- | Cr | yellow. |
| 20 | 5-nitro-2-amino-1-phenol. | ----do---- | Cr | bluish red. |
| 21 | 4-chloro-6-nitro-2-amino-1-phenol. | ----do---- | Cr | red. |
| 22 | 2-amino-1-benzoic acid-5-sulphonic acid-N-methyl-hydroxy-ethylamide. | 1-(3',4'-dichlorophenyl)-3-methyl-5-pyrazolone. | Cr | yellow. |
| 23 | 2-amino-1-pheno-4-sulphonic acid-N-methyl-hydroxy-ethylamide. | 3-methoxy-4-methyl-1-phenol. | Cr | Bordeaux red. |
| 24 | 2-amino-1-phenol-4-sulphonic acid-N-dimethylamide. | 2-hydroxynaphthalene-6-sulphonic acid-N-methyl-hydroxy-ethylamide. | Cr | reddish violet. |
| 25 | 2-amino-1-phenol-5-sulphonic acid-N-methyl-hydroxy-ethylamide. | 1-carbonethoxy-amino-7-hydroxy-naphthalene. | Cr | bluish grey. |

What we claim is:

1. A complex heavy metal compound of the general formula:

$$[D—M_1—D]M_2$$

wherein:

$M_1$ is a complexly bound heavy metal selected from the group consisting of Cr and Co,
$M_2$ is a cation and
D is a co-ordinated unsulphonated monoazo dyestuff of the formula:

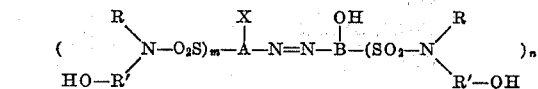

wherein:

A represents a radical of the benzene series,
B represents the radical of a member selected from the group consisting of phenolic, naphtholic and pyrazolonic coupling components, containing the hydroxy group in ortho-position to the azo group,
X represents a metallizable group in o-position to the azo group selected from the group consisting of OH and COOH,
R and R' are lower alkyl radicals, in which R+R' contain not more than 8 carbon atoms, and
each of $m$ and $n$ is one of the numerals 0 and 1, $m+n$ being at least 1.

2. A complex chromium compound of the formula:

$$[D—Cr—D]M$$

wherein M is a cation and D is a co-ordinated monoazo dyestuff of the formula:

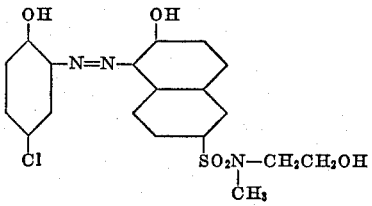

3. A complex cobalt compound of the formula:

$$[D—Co—D]M$$

wherein M is a cation and D is a co-ordinated monoazo dyestuff of the formula:

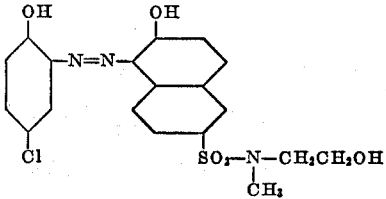

4. A complex chromium compound of the formula:

$$[D—Cr—D]M$$

wherein M is a cation and D is a co-ordinated monoazo dyestuff of the formula:

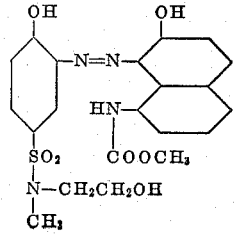

5. A complex cobalt compound of the formula:
[D—Co—D]M
wherein M is a cation and D is a co-ordinated monoazo dyestuff of the formula:
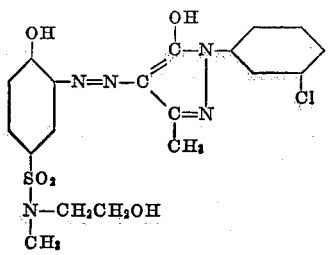
6. A complex chromium compound of the formula:
[D—Cr—D]M
wherein M is a cation and D is a co-ordinated monoazo dyestuff of the formula:
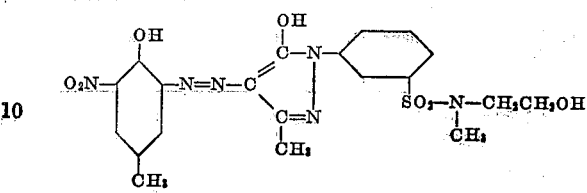
References Cited in the file of this patent
UNITED STATES PATENTS
| | | |
|---|---|---|
| 2,391,180 | McNalley et al. | Dec. 18, 1945 |
| 2,537,098 | Slifkin et al. | Jan. 9, 1951 |
| 2,606,185 | Widmer et al. | Aug. 5, 1952 |